United States Patent Office 2,852,492
Patented Sept. 16, 1958

2,852,492

N,N'-BIS(p-CARBOALKOXYBENZOYL)PIPER-AZINES AND POLYESTERS THEREFROM

Jack L. R. Williams and Thomas M. Laakso, Rochester, N. Y., assignors to Eastman Kodak Company, Rochester, N. Y., a corporation of New Jersey No Drawing. Application May 3, 1956
Serial No. 582,339

6 Claims. (Cl. 260—75)

This invention relates to monomeric N,N'-bis-(p-carboalkoxybenzoyl)piperazines which are useful in the manufacture of linear polyesters containing chain amide groups and to the polyesters prepared therefrom.

A large number of polyesters are known to the art which are prepared by condensing at least one bifunctional dicarboxylic acid, preferably in ester form, with at least one glycol. The resulting highly polymeric polyesters have many desirable properties but are often somewhat difficult to process because of their inherent tendency to crystallize rapidly. In the manufacture of highly polymeric linear polyesters, it is usually desirable to cool down the molten polymer resulting from the polymerization so as to "freeze" the polymer in an amorphous form. Thereafter the uncrystallized polymer can be stretched either transversely or longitudinally or both in order to orient the polymer, whereupon the oriented polymer is subjected to a heat treatment to allow crystallization in the oriented form. The readily crystallizable polyesters such as the polymethylene terephthalates obtained by condensation of terephthalic acid or an ester thereof with a polymethylene glycol such as ethylene glycol, or the polyesters containing internal amide linkages prepared by condensing one or more glycols with an ester of N,N'-bis(p-carboxybenzoyl) alkylene diamines as disclosed in Laakso and Williams Serial No. 504,107, filed April 26, 1955, and similar well known polyesters prepared by condensing one or more aliphatic glycols with an aromatic or aliphatic dicarboxylic acid or mixture thereof, thus pose a problem in commercial manufacture unless they can be modified by inclusion of another component which improves their quenchability characteristics without deleteriously affecting the desirable properties of the polymers.

It is accordingly an object of this invention to provide certain new and improved monomeric bifunctional dicarboxylic acid components which can be polymerized with a glycol or glycols, with or without one or more other dicarboxylic acid components to form linear condensation polymers which possess improved quenchability characteristics. It is another object of the invention to provide, as new compounds, monomeric N,N'-bis(p-carboalkoxybenzoyl)piperazines which are useful as intermediates for the preparation of linear polyesters, and particularly as modifiers for any of the well known polyesters. Another object of the invention is to improve the quenchability of the well known polyester compositions, and particularly those prepared by condensing a glycol with an aromatic dicarboxylic acid, by forming a copolyester of such reactants with the new compounds embodying this invention. Other objects will be apparent from the description and claims which follow.

These and other objects are attained by means of this invention wherein it has been found that N,N'-bis(p-carboalkoxybenzoyl)piperazines wherein the alkoxy group contains 1–4 carbon atoms form linear polyesters by condensation with one or more glycols and that polyesters of improved quenchability characteristics can be achieved by copolymerizing such piperazine derivatives in admixture with at least one bifunctional dicarboxylic acid component and at least one glycol. The monomeric compounds embodying this invention are of particular utility in condensation polymerizations with hexane-1,6-diol alone or together with another glycol and/or another dicarboxylic acid component.

The homopolyesters of the piperazine derivatives defined herein with glycols such as hexane-1,6-diol are non-crystalline materials having a high viscosity, and such homopolyesters can be used for blending with the well known polyesters obtained by condensing a glycol with a dicarboxylic acid. Generally, however, the modification in quenchability characteristics is best achieved by co-condensing the piperazine derivative with the glycol and other dicarboxylic acid component. In such formation of copolyesters, the dicarboxylic acid components desirably consist of 1–20 mol percent of the piperazine derivative and 80–99 mol percent of other dicarboxylic acid component, preferably in ester form, such as terephthalic acid, 4,4'-bis(sulfonyl)dibenzoic acid, N,N'-bis(p-carboxylbenzoyl)hexamethylene diamine, or similar alkylene diamine derivative wherein the alkylene group contains 2–12 carbon atoms, or other well known aromatic dicarboxylic acid component ordinarily used in polyester manufacture. The dicarboxylic acid portion can also include one or more aliphatic dibasic acids such as succinic acid, azeleic acid or similar aliphatic dicarboxylic acid which is preferably present in a lesser molar amount than is the aromatic dicarboxylic acid.

The monomeric compounds embodying the invention are readily prepared by reacting piperazine hydrate with a p-carboalkoxybenzoyl chloride wherein the alkoxy group contains 1–4 carbon atoms. The nature of the alkoxy group does not affect the formation of the bifunctional monomer and hence the carbomethoxy, carboethoxy, carbopropoxy and carbobutoxy derivatives can be used with equal facility for forming the monomeric esters embodying the invention. The preparation of a typical monomer of the invention is illustrated by the following example.

*Example 1*

Ninety-seven grams (0.5 mole) piperazine hydrate was dissolved in 600 ml. water. To this solution was added with efficient stirring, one-half of the total amount of 200 grams (1.0 mole) p-carbomethoxybenzoyl chloride dissolved in 200 ml. dry benzene. After twenty minutes stirring, one-half of the total amount of 40 grams (1 mole) sodium hydroxide (dissolved in enough water to equal the total volume of acid chloride solution) was added at once. One-half of the remaining acid chloride solution was then added after five minutes of stirring and after twenty minutes, one-half of the remaining alkali solution and so on until all reagents had been added. Stirring was continued for 20 minutes after addition was complete. The reaction mass was poured into the ice water and the white solid filtered. The wet filter cake was crystallized from 10 liters of 3A alcohol.

The yield of pure white N,N'-bis(p-carbomethoxybenzoyl) piperazine, M. P. 230–232° C., was 115 grams, or 56.1% of the theoretical value 205 grams.

Calculated for $C_{22}H_{22}O_6N_2$: C, 64.5; H, 5.3; N, 6.8. Found: C, 64.9; H, 4.9; N, 7.1.

The corresponding N,N' - bis(p - carboethoxybenzoyl)piperazine, N,N'-bis(p-carbopropoxybenzoyl)piperazine, N,N'-bis(p-carbobutoxybenzoyl)piperazine and similar piperazine derivatives embodying the invention are readily prepared in exactly the same manner and are included within the scope of the invention.

The formation of homopolyesters or copolyesters embodying the monomers herein defined can be readily carried out in accordance with the usual and well known methods for making polyesters involving condensation of a glycol or glycols and the dicarboxylic acid components in the presence of an esterification catalyst, the condensation reaction being carried out until the polymerization has proceeded to the desired inherent viscosity which is usually of the order of 0.4 or higher.

Thus the polymers embodying this invention can be prepared according to the general procedures outlined by Carothers in U. S. 2,071,250, and the piperazine derivatives embodying the invention can be used to form copolyesters with any of the polyester forming materials disclosed by Carothers as well as those which have since been made known in the art. In carrying out the process embodying the invention, at least two molar proportions of glycol are used for each molar proportion of the dicarboxylate monomer or monomers, with an excess of glycol preferably being employed. The initial ester interchange is readily effected by heating the mixture of glycol component and dicarboxylate component or components in the presence of an ester interchange catalyst and at a temperature above the melting point of the reactants. The initial stage of the reaction is usually carried out at atmospheric pressure and temperatures of 100–300° C. and preferably 200–300° C. for best results, although lower or higher temperatures can be employed. Generally, the dicarboxylate component or components are employed in the form of a lower alkyl diester for ease of removal of the alcohol which is liberated during the initial stage, such alcohol being continuously removed during the ester interchange for best results. If desired, however, free dicarboxylic acids can be used or ester-forming derivatives thereof such as salts, halides or amines. The term "dicarboxylic acid components" as employed herein is intended to include both the free acids, the esters thereof, and the ester-forming derivatives.

The process is facilitated by use of an ester-interchange catalyst, a large number of such catalysts being known to the art. Typical ester-interchange catalysts which can be employed include the metal hydrides such as calcium hydride, lithium hydride, sodium hydride, or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals, free metals such as sodium, potassium, lithium, calcium, cobalt, tin, germanium, cerium, magnesium, lead, antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5–30 minutes; and, if desired, the temperature can be raised or the pressure reduced at the end of the first stage to effect completion of the removal of the alcohol liberated during the initial stage. Polymerization of the glycol ester of the dicarboxylic compound is then effected to the desired degree by continuing the heating under reduced pressure at least until the polymer reaches the fiber-forming stage. The polymerization can be effected by first obtaining a low viscosity polymer in powder form, and then continuing the polymer build-up in powder form under vacuum, or by continuing the heating after the initial stage under reduced pressure whereby the polymer remains molten until the desired molecular weight and inherent viscosity is achieved.

The polymers embodying the invention are polymerized until a fiber-forming stage is achieved, i. e. until a rod dipped into the melt will pull a filament when drawn from the melt. Usually for optimum results, the polymerization is carried out until an inherent viscosity of at least 0.8 is attained with viscosities of 0.8–1.1 being preferred, although lower or higher viscosities may be desired in certain cases. The polymers of the invention usually have melting points above 200° C. The preferred polymer compositions are those having melting points in the range of about 240°–280° C., since the polymers melting above about 280° C. are difficult to extrude and process in commercial practice.

As has been indicated, any one or more of the alkylene glycols containing 2–10 carbon atoms can be condensed with any one or more of the dicarboxylate monomers as defined herein. The resulting polymers can be used alone or in blends of two or more of such polymers, or blends of such polymers with other polymeric materials such as polyesters, polyamides, copolyesters, polyesteramides and the like. In some cases, it is also desirable to modify the polymers by coreacting another dicarboxylic acid (preferably in ester form) with the glycol and dicarboxylate monomer, such other dicarboxylic acids being typified by aromatic dibasic acids such as terephthalic acid, isophthalic acid, 4,4'-sulfonyl dibenzoic acid and the like or aliphatic dibasic acids such as adipic acid, sebacic acid, azelaic acid and the like. The polymers of the invention can be quenched following polymerization by cooling to a temperature below the minimum crystallization temperature.

When the homopolyesters of the piperazine derivatives are prepared, the glycol employed is desirably hexane-1,6-diol since the shorter chain glycols such as butane-1,4-diol does not give a polymer.

The polymerization proceeds rapidly and ordinarily the fiber-forming stage is reached within 10–30 minutes although the time necessary for polymerization will vary depending upon the heating temperature, kind and amount of catalyst, and similar variable factors. The polymerization is facilitated by removal from the reaction zone of the glycol liberated during the polymerization. The polymers and particularly the copolyesters obtained by means of this invention can be extruded from the melt to form filaments or sheets as desired. In the case of the copolyesters, the resulting shaped articles are then oriented by being stretched either laterally or longitudinally, or both, whereby a marked increase in physical properties is obtained. The degree of stretching will vary somewhat depending upon the polymer composition and the properties desired, but sheets, filaments, fibers etc. are usually stretched 50–600% of their original extruded dimension for best results. The shaped articles are usually cold drawn, i. e. drawn at a temperature between the second order transition temperature and the minimum crystallization temperature of the polymer, although, in some cases, the polymers can be drawn at temperatures above the minimum crystallization temperature.

The polymers embodying the invention quench readily due to an unusually slow degree of crystallization. The copolyesters, when formed into fibers, filaments, sheets or the like, are characterized by exceptional physical and mechanical properties, including strength, flexibility and wear resistance in combination with the unusual quenchability characteristics. The copolyesters are of particular utility in forming sheeting which can be used as support in photographic applications. This is particularly true when the copolyester is formed from a piperazine derivative embodying this invention, hexane-1,6-diol, and an aromatic dicarboxylic acid such as terephthalic acid or an ester of N,N'-bis(p-carboxybenzoyl)alkylene diamine wherein the alkylene group contains 2–10 carbon atoms.

The use of the particular dicarboxylate piperazine derivatives instead of a free diamine is of particular importance in practicing the invention since the condensation thereby is a conventional polyester reaction rather than involving competing polyester and polyamide reactions which usually result in mixtures of polymers as well as polyester amides. The invention with regard to the polymers and copolyesters is illustrated by the following examples which are included for purposes of illustration and which are not intended to limit the scope of the invention unless otherwise specifically indicated:

*Example 2*

To a mixture of 41 g. (0.1 mole) of N,N'-bis(p-carbomethoxybenzoyl)piperazine and 40 g. (0.3 mole) of hexane-1,6-diol at 250° C. under nitrogen was added 0.5 ml. of catalyst solution which had been prepared by the addition of 0.2 g. of sodium and 3 ml. of titanium butoxide to sufficient ethanol to bring the final volume to 100 ml. The temperature of the reaction mixture was held at 240–270° C. for 20 minutes, during which time ester interchange occurred with formation of the glycol diester of the piperazine dicarboxylate and liberation of methanol. The methanol was removed from the reaction zone as formed. Thereafter the reaction mixture was heated at 215° C. and 0.1 ml. Hg pressure for 20 minutes. The resulting homopolyester had an inherent viscosity of 0.82 and a melting point of 255° C.

*Example 3*

The process described in the preceding example was employed to form a copolyester by the condensation of 42.1 g. (0.09 mole) of the diethyl ester of N,N'-bis-(p-carboxybenzoyl)hexamethylene diamine, 4.1 g. (0.01 mole) of N,N'-bis(p-carbomethoxybenzoyl) piperazine and 40 g. (0.3 mole) of hexane-1,6-diol using 0.5 ml. of the catalyst solution described in the preceding example. The resulting copolyester had an inherent viscosity of 1.02 and a melting point of 257° C. This copolyester crystallized much more slowly than the corresponding polyester from hexane-1,6-diol and N,N'-bis(p-carboethoxybenzoyl)hexamethylene diamine containing none of the piperazine derivative. Thus, the molten polymer could be readily quenched upon extrusion in the form of either film or fiber and could thereupon be oriented by drawing without the disadvantages which accompany partially crystallized material. Following the orientation, the polymer was readily crystallized by heating it above its minimum crystallization temperature in an infrared oven. The oriented articles obtained by means of this invention were extremely strong and flexible, possessed excellent dye affinity and exhibited unusual thermal dimensional stability. The copolyesters were also useful in making tubing, molded articles, sheeting for packaging, coating materials and the like.

The piperazine derivatives embodying the invention showed equally good results when used in minor amounts to modify terephthalate polyesters and polyesters of bis sulfonyldibenzoic acid. Best results were obtained when the piperazine derivative amounted to from $\frac{1}{20}$ to $\frac{1}{4}$ of the total dicarboxylate components. Since the ester groups were split off during the initial ester interchange, the nature of the carbalkoxy group in the piperazine derivative had no effect on the course of the polymerization. Generally, the lower alkyl derivatives containing 1–4 carbon atoms were employed for convenience and economy and for ease in removing the alcohol liberated during the ester interchange reaction.

Thus by means of this invention a modifier component is provided which possesses unusual utility in modifying the quenchability characteristics of the well known polyesters without deleteriously affecting the other desirable properties of the polymer.

Although the invention has been described in detail with particular reference to certain preferred embodiments thereof, variations and modifications can be effected within the spirit and scope of the invention as described hereinabove and as defined in the appended claims.

We claim:

1. N,N'-bis(p-carboalkoxybenzoyl)piperazine wherein the alkoxy group contains 1–4 carbon atoms.

2. N,N'-bis(p-carbomethoxybenzoyl)piperazine.

3. A condensation polymer having an inherent viscosity of at least 0.4 and being the product obtained by condensing at 100–300° C. a mixture of an alkylene glycol containing 2–10 carbon atoms with not more than an equimolar amount of acidic material consisting of 1–20 mole percent of an N,N'-bis(p-carboalkoxybenzoyl) piperazine wherein the alkoxy group contains 1–4 carbon atoms and 99–80 mole percent of a bifunctional acidic compound from the group consisting of aromatic dicarboxylic acids and alkyl esters thereof wherein the alkyl group contains 1–4 carbon atoms.

4. A condensation polymer having an inherent viscosity of at least 0.4 and being the product obtained by condensation at 100–300° C. of a mixture of bifunctional reactants comprising hexane-1,6-diol with not more than an equimolar amount of an N,N'-bis(p-carboalkoxybenzoyl)piperazine wherein the alkoxy group contains 1–4 carbon atoms.

5. A condensation polymer having an inherent viscosity of at least 0.4, obtained by the coreaction at 100–300° C. of a mixture of hexane-1,6-diol with not more than an equimolar amount of a mixture of 80–99 mole percent of an alkyl diester of N,N'-bis(p-carboxybenzoyl)hexamethylene diamine and 1–20 mole percent of an N,N'-bis(p-carboalkoxybenzoyl)piperazine wherein the alkoxy group contains 1–4 carbon atoms, the alkyl group in each case containing 1–4 carbon atoms.

6. A condensation polymer having an inherent viscosity of at least 0.4 obtained by coreacting at 100–300° C., a mixture of hexane-1,6-diol with not more than an equimolar amount of N,N'-bis(p-carbomethoxybenzoyl)piperazine.

References Cited in the file of this patent

UNITED STATES PATENTS 2,717,896    Goldman _____ Mar. 2, 1953